United States Patent [19]

Reizer et al.

[11] 4,365,029

[45] Dec. 21, 1982

[54] COATING AND ADHESIVE COMPOSITION COMPRISING (A) PVC, (B) ACRYLATE POLYMER HAVING CARBOXYL CURE SITES AND (C) REINFORCING FILLER

[75] Inventors: Robert F. Reizer, Stanton; Albert H. Koivu, Huntington Beach; Leslie J. Cohen, Los Angeles, all of Calif.

[73] Assignee: McDonnell Douglas Corporation, Long Beach, Calif.

[21] Appl. No.: 234,779

[22] Filed: Feb. 17, 1981

[51] Int. Cl.³ .................... C08F 8/00; C08L 63/00; C08L 33/02; C08K 3/04

[52] U.S. Cl. ..................... 523/437; 524/364; 524/365; 524/522; 525/108; 525/221; 525/227; 428/442; 428/463; 428/514; 428/518; 428/520

[58] Field of Search .............. 525/221, 227, 108; 260/42.28, 42.49, 37 EP, 32.8 EP, 32.8 R, 33.6 EP, 33.6 VA; 523/437; 524/364, 365, 522

[56] References Cited

U.S. PATENT DOCUMENTS

| | | | |
|---|---|---|---|
| 3,062,778 | 11/1962 | Van Cleve | 525/227 |
| 3,277,042 | 10/1966 | Richart | 525/227 |
| 3,326,833 | 6/1967 | Raley | 260/42.49 |
| 3,382,198 | 5/1968 | Elslager | 524/399 |
| 3,560,592 | 2/1971 | Decroly et al. | 525/227 |
| 3,580,972 | 5/1971 | Isaksen et al. | 523/437 |
| 3,859,384 | 1/1975 | Carty et al. | 525/227 |
| 3,867,481 | 2/1975 | Whang | 525/227 |
| 3,950,281 | 4/1976 | Usamoto et al. | 525/227 |
| 3,998,990 | 12/1976 | Iwami et al. | 428/442 |
| 4,113,681 | 9/1978 | Harmuth | 525/108 |

FOREIGN PATENT DOCUMENTS

| | | | |
|---|---|---|---|
| 588142 | 12/1959 | Canada | 525/121 |
| 2853671 | 6/1980 | Fed. Rep. of Germany | 525/108 |
| 53-2556 | 1/1978 | Japan | 524/522 |

Primary Examiner—Paul Lieberman
Assistant Examiner—Herbert J. Lilling
Attorney, Agent, or Firm—Max Geldin

[57] ABSTRACT

A coating and adhesive composition which comprises an ethylene-acrylic elastomer, a high molecular weight polyvinyl chloride and a filler, preferably carbon black. The composition is cured with a suitable catalyst, preferably an amine catalyst, to form an abrasion resistant coating, which can also be employed as a repair coating, especially for damaged plastic materials or sheets on a substrate, particularly sheets formed from ethylene-acrylic elastomer. The composition can also be employed as an adhesive or bonding material for such plastic sheets.

17 Claims, No Drawings

COATING AND ADHESIVE COMPOSITION COMPRISING (A) PVC, (B) ACRYLATE POLYMER HAVING CARBOXYL CURE SITES AND (C) REINFORCING FILLER

BACKGROUND OF THE INVENTION

This invention relates to a coating composition or adhesive, and is particularly concerned with the provision of a coating composition which can be cured to form an abrasion resistant coating, especially useful as a repair coating for certain plastic materials or sheets, especially ethylene-acrylic copolymer elastomer sheets.

Abrasion resistant coatings are of particular importance for the protection of the surfaces of aircraft components such as the wings and tail surfaces, and missile motor cases. These components can be formed of various materials such as aluminum, plastic, and the like.

Further, during a period of wear of plastic or resin coatings and sheets applied to substrates, particularly of aircraft components, the plastic surfaces or coatings become contaminated or damaged, requiring repair of the contaminated or damaged area. An example of a plastic coating or sheet material used on aircraft components, is the material formed from ethylene-acrylic elastomers, an example of which is the ethylene-acrylic elastomer marketed as "Vamac" by Du Pont.

Illustrative of prior art protective coating compositions is U.S. Pat. No. 2,783,165, which discloses a protective coating composition including a pigment, a binder and a volatile solvent. The pigment is carbon black, the solvent is a chlorinated hydrocarbon and the binder can be a resin such as a copolymer of vinyl chloride and vinyl acetate, polyacrylates, and other resins.

U.S. Pat. No. 4,169,088 discloses a sealing solution for removing graffiti, formed by combining a suitable polyvinyl alcohol with a solution of acrylic resin to form a polyvinyl alcohol-acrylic resin.

U.S. Pat. Nos. 3,713,926 and 3,975,558 disclose compositions and processes for patching plastic and leather-like materials.

One object of the present invention is the provision of a composition for producing a tough abrasion resistant resin coating. Another object is to provide a composition of the above type which can be employed for the repair of damaged plastic surfaces or sheets, particularly ethylene-acrylic elastomers or resins, to produce a substantially continuous tough abrasion resistant coating over the damaged areas. Yet another object of the invention is the provision of an adhesive or bonding composition which can be cured to provide a strong bond between plastic sheets, particularly ethylene-acrylic elastomer sheets.

SUMMARY OF THE INVENTION

The above objects and advantages are achieved according to the invention, by the provision of an abrasion resistant coating composition or adhesive which comprises an ethylene-acrylic elastomer, a high molecular weight polyvinyl chloride and a filler, preferably carbon black.

The ethylene-acrylic elastomer and the polyvinyl chloride components are described in greater detail below, and the ranges of proportions of such components of the composition are further set forth in detail below.

Although not essential, it is preferred to incorporate into the composition an epoxy resin, and particularly in certain ranges of proportions, as described in greater detail below.

The composition can be cured to a tough abrasion resistant coating or to form a tough bond when employed as an adhesive, by means particularly of an amine catalyst or curing agent, and by the application of heat.

The above coating composition is particularly designed for the repair of damaged ethylene-acrylic sheets, and for bonding such sheets together.

DETAILED DESCRIPTION OF THE INVENTION COMPOSITION AND PREFERRED EMBODIMENTS

The first essential component of the coating composition of the invention is an ethylene-acrylic elastomer, which is primarily a copolymer of ethylene and methyl acrylate, and having amine-reactive cure sites. Such ethylene-acrylic elastomer or polymer can be represented by the structural formulae of the individual monomer components set forth below.

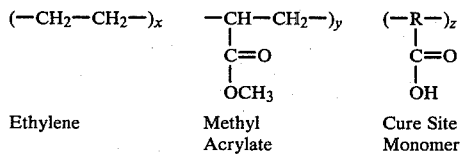

The cure site monomer groups are carboxyl or carboxylic acid groups, such as acrylic acid groups.

The number of x, y and z components in the above ethylene-acrylic elastomer is such that the elastomer is understood to have a molecular weight in the range of about 450,000 and 650,000 and having about 25 to 60% ethylene groups, about 60 to 25% acrylate groups, and about 5 to 15% cure site carboxyl groups. A preferred form of this material contains about 45% ethylene groups, about 45% methyl acrylate groups, and about 10% carboxylic acid cure site monomer groups such as acrylic acid groups.

An illustrative form of ethylene-acrylic elastomer is the material marketed as "Vamac" by Du Pont, and described in the Du Pont brochure titled "Vamac", No. EA-000.2 (1976). This polymer upon curing has high heat and weather resistance. Primary and secondary aliphatic polyamines are employed to cross-link the carboxyl cure sites of the ethylene-acrylic elastomer. Thus, for example, diethylenetriamine can be employed in the compositions for both room temperature initial cure and for elevated temperature curing. The amine is generally a low viscosity liquid which can be blended with the coating composition prior to use. Diethylene triamine is an example of a low temperature curing agent and diphenyl guanidine and methylene dianiline are examples of elevated temperature curing agents.

The second essential component of the coating composition or adhesive of the invention is a high molecular weight polyvinyl chloride having a molecular weight corresponding to an inherent viscosity of 1.0 to 1.40. Such polyvinyl chloride component has a molecular weight ranging from about 60,000 to about 150,000. An illustrative type of polyvinyl chloride particularly useful in the invention composition is the material marketed as "Geon 121" by B. F. Goodrich. The polyvinyl chloride component functions to enhance the wear or abrasion resistance properties of the resulting coating. It also functions to increase the hardness of the coating.

The third essential component is a suitable filler which functions as a reinforcing filler for the cured coating composition. For this purpose, carbon black has been found to be particularly effective in the coating and adhesive composition of the invention. Various types of carbon black can be employed such as those marketed as SRF (N-774) and SAF (N-110). The carbon black aids in conferring toughness and abrasion resistance on the coating.

The amount of ethylene-acrylic elastomer or copolymer which can be employed in the invention composition can range from about 45 to about 65 parts; the amount of high molecular weight polyvinyl chloride employed can range from about 15 to about 45 parts; and the amount of filler, especially carbon black, utilized, can range from about 5 to about 30 parts; by weight of the composition.

The amine curing agent or agents employed, either separately or in admixture, can range from about 1 to about 6 parts, by weight.

Where a more flexible coating is desired, the amount of ethylene-acrylic elastomer is increased and a reduced amount of filler, e.g. carbon black, is employed, within the ranges noted above. The higher the polyvinyl chloride content of the invention composition within the above noted range, the greater are the wearing or abrasion resisting characteristics of the cured coating.

There can also be incorporated into the invention composition as an optional component, an epoxy resin. Preferred epoxies comprise the glycidyl ethers such as the glycidyl ethers of the phenols, and particularly those prepared by reacting a dihydric phenol with epichlorhydrin, e.g. the epoxy prepared by reacting epichlorhydrin and bisphenol A. Representative of such epoxies are, for example, EPON 828 and 815, marketed by Shell Chemical Co.

The amount of epoxy resin which can be employed in the coating composition of the invention can range from about 3 to about 30 parts, by weight.

The epoxy resin generally is of the type which reacts with the carboxyl sites on the ethylene-acrylic elastomer, and imparts stiffness and additional abrasion resistance to the cured coating, similarly to the high molecular weight polyvinyl chloride. However, as noted above, the epoxy resin, although preferred, is not an essential component in the coating and adhesive composition of the invention.

The above polymers are generally processed on a rubber mill and placed in solution with a suitable organic solvent such as methyl ethyl ketone or toluene, or mixtures thereof. The solids content of the resulting solution can vary, but the organic solvent usually is employed in an amount to form a liquid composition having about a 15 to 35% solids content, by weight.

The coating composition in the form of a solution of the above-noted polymer components and carbon black, in the organic solvent, can be applied to a substrate to form a coating thereon, or to cover a damaged area of a plastic sheet such as an ethylene-acrylic elastomer sheet, on a substrate, by any suitable means such as brushing, flow coating or metering, dipping and spraying. For spraying application, the solution is made relatively dilute, e.g. about 15% solids content, and has relatively low viscosity, e.g. about 1,000 cps (centipoises). More concentrated solutions of higher viscosity are used for brushing or metering applications. Thus, for brushing application, the solution can have a viscosity of about 2,500 cps and for metering application, about 5,000 cps. The coating composition can be applied to metal, e.g. aluminum, titanium and steel, employing suitable metal primers such as zinc chromate, and to ceremic, wood and plastic, such as ethylene-acrylic elastomer, substrates. A uniform thickness of coating, e.g. of about 0.001 to about 0.125 inch can be provided.

When the composition of the invention is employed as a repair meterial for contaminated or damaged ethylene-acrylic sheets or coatings, after removal of a portion of the damaged area as by cutting, the coating composition is applied over the area previously covered by the damaged portion, as noted above. When the coating composition is employed as an adhesive, e.g. to bond ethylene-acrylic sheets together, or to bond one or more of such sheets to another plastic material such as Kevlar (understood as comprised of poly (paraphenylterephthalamide), the composition is applied between the surfaces to be bonded and is cured under heat and pressure.

The coating or adhesive composition of the invention can be cured at temperatures ranging from room temperature, e.g. up to about 225° F., depending upon the particular catalyst system employed. Where a combination of low temperature curing agents such as diethylene triamine, and elevated temperature curing agent such as methylene dianiline are employed, the coating or adhesive composition can be cured in stages commencing at relatively low temperatures of about 80° F. up to about 200° F. Thus for example, the assembly to be cured can be placed in a vacuum bag and then in an air circulating oven, for gradual heating over a period of say about 2 to 4 hours at temperatures ranging from 80° F. to about 130° F. to obtain a low temperature cure. Thereafter, the cured coating or cured adhesive can be post-cured, e.g. in an air circulating oven, at temperature ranging from about 100° F. up to about 200° F. for a period ranging from about 1 to about 2 hours.

As previously noted, the low temperature curing agent or catalyst such as diethylene triamine (DTA) partially cures the coating composition and gels it, and the elevated temperature curing agent such as methylene dianiline (MDA) and diphenyl guanidine (DPG), functions for producing final curing and post curing. The tensile and elongation properties of the cured coating can be tailored to the degree of cure.

The following are examples of practice of the invention.

EXAMPLE I

A composition consisting of the components noted below was prepared.

TABLE 1

| Components | Parts by weight |
| --- | --- |
| Ethylene-acrylic elastomer (Vamac B-124) | 55.6 |
| Polyvinyl chloride (Geon 121) | 35.0 |
| Carbon black (SRF-N-774) | 4.3 |
| Carbon black (SAF-N-110) | 8.7 |
| Diphenyl guanidine | 1.1 |
| Methylene dianiline | 0.3 |
| Diethylene triamine | 1.0 |
| | 106.0 |

The above composition was dissolved in a solvent consisting of 80 parts methyl ethyl ketone and 20 parts toluene, by volume, to obtain a 30% solids solution.

The above composition was prepared by mixing the ethylene-acrylic elastomer, the polyvinyl chloride and carbon black components, on a rubber mill. To the resulting mixture were added the above noted amine catalysts. The resulting mixture was then placed into solution in the above noted solvent to form a final coating solution.

The resulting solution was brush coated on a polished aluminum casting plate to form a uniform layer of coating of 0.004" in thickness every 15 minutes. Thirty coats were thus applied to a total thickness of 0.120".

The coated plate was then dried in open air for 48 hours. Thereafter, the coated assembly was placed in a vacuum bag and then in an air circulating oven to carry out a low temperature curing cycle as follows:
  30 minutes at 80° F.
  60 minutes at 100° F.
  120 minutes at 130° F.
Shore "A" hardness of the coating=70

Thereafter, the assembly was post cured in an air circulating oven at elevated temperature as follows:
  20 minutes at 100° F.
  20 minutes at 120° F.
  20 minutes at 140° F.
  20 minutes at 160° F.
  20 hours at 180° F.
The test results are noted below.

| | |
|---|---|
| Tensile strength psi | 2700 |
| Tensile elongation percent | 150 |
| Tear strength PPI | |
| Die "B" | 435 |
| Die "C" | 395 |
| Hardness shore "A" | 98 |
| "D" | 65 |
| Specific gravity Gm/cc | 1.27 |

EXAMPLE II

The procedure of Example I was followed except that a 0.070" thick coated sheet was fabricated without the use of a vacuum bag cure cycle, and employing the following cure cycle.
  24 hrs. air dry
  3 hrs. at 100° F.
  Shore "A"=75
  1 hr. at 150° F.
  1 hr. at 180° F.
  70 hrs. at 212° F.
  Shore "A"=100
  Shore "D"=72

EXAMPLE III

An ethylene-acrylic elastomer (Vamac) sheet on a substrate, contained a damaged area. A portion of the damaged area of the sheet was cut out and a coating of the composition of Example I was applied substantially in the manner described in Example I, over the damaged area, and such coating cured as described in Example I, to form a substantially continuous tough abrasion resistant coating over the damaged area of the sheet.

EXAMPLE IV

The procedure of Example III was substantially followed except that prior to curing, another ethylene-acrylic elastomer sheet was then applied over the coating, and the resulting assembly was cured substantially in the manner described in Example I above.

The coating composition of the invention thus functions as an adhesive to bond the newly applied ethylene-acrylic elastomer sheet over the damaged area of the initial ethylene-acrylic elastomer sheet, following curing.

EXAMPLE V

The coating composition of Example I was applied to impregnate Kevlar roving which functioned as an overrap on an epoxy missile motor case.

The coating composition was applied to a thickness of 0.100" and cured employing a vacuum bag while heating at from 150° F. to 180° F. for an extended time of 20 hours, to obtain a coating having a shore "A" hardness of 90.

EXAMPLE VI

The composition of Example 1 was employed as an adhesive to bond ethylene-acrylic elastomer sheets to a Kevlar-epoxy cover of a missile motor case, employing the cure cycle noted above in Example 1.

The coating composition of the invention also can be employed as a rain erosion resistant coating for the leading edge of the wings and tail surfaces of aircraft, and helicopter blades. The composition can also be employed as an abrasion resistant coating on boots, wing walks, and other areas generally subject to high abuse.

From the foregoing, it is seen that the invention provides a novel coating and adhesive composition for the production of an improved, tough, and abrasion resistant coating, following curing, consisting essentially of ethylene-acrylic elastomer, high molecular weight polyvinyl chloride, and carbon black, and which optionally can include an epoxy resin.

While particular embodiments of the invention have been described for purposes of illustration, it will be understood that various changes and modifications within the spirit of the invention can be made, and the invention is not to be taken as limited excpet by the scope of the appended claims.

What is claimed is:

1. An abrasion resistant coating composition or adhesive which comprises an ethylene-acrylic elastomer having cure site carboxyl groups, a high molecular weight polyvinyl chloride and a reinforcing filler.

2. The coating or adhesive composition defined in claim 1, said filler being carbon black.

3. The coating or adhesive composition as defined in claim 2, employing about 45 to about 65 parts of said ethylene-acrylic elastomer, about 15 to about 45 parts of said polyvinyl chloride and about 5 to about 30 parts of said carbon black, by weight.

4. The coating or adhesive composition as defined in claim 3, said ethylene-acrylic elastomer being a copolymer of ethylene and methyl acrylate.

5. The coating or adhesive composition as defined in claim 4, said ethylene-acrylic elastomer having about 25 to 60% ethylene groups, about 60 to 25% of said acrylate groups, and about 5 to 15% cure site carboxyl groups.

6. The coating or adhesive composition as defined in claim 5, said ethylene-acrylic elastomer having a molecular weight in the range from about 450,000 to 650,000.

7. The coating or adhesive composition as defined in claim 3, said polyvinyl chloride having a molecular weight ranging from about 60,000 to about 150,000.

8. The coating or adhesive composition as defined in claim 3, said ethylene-acrylic elastomer having a molecular weight in the range of about 450,000 to 650,000, said ethylene-acrylic elastomer having about 25 to 60% ethylene groups, about 60 to 25% of said acrylate groups, and about 5 to 15% cure site carboxyl groups.

9. The coating or adhesive composition as defined in claim 8, said ethylene-acrylic elastomer being a copolymer of ethylene and methyl acrylate, and said cure site carboxyl groups comprising acrylic acid groups.

10. The coating or adhesive composition as defined in claim 8, said ethylene-acrylic elastomer containing about 45% ethylene groups, about 45% methyl acrylate groups and about 10% cure site carboxyl groups, said cure site carboxyl groups comprising acrylic acid groups.

11. The coating or adhesive composition as defined in claim 1, including an epoxy resin.

12. The coating or adhesive composition as defined in claim 2, including an epoxy resin.

13. The coating or adhesive composition as defined in claim 4, including an epoxy resin in an amount ranging from about 3 to about 30 parts, by weight.

14. The coating or adhesive composition as defined in claim 3, including an organic solvent in an amount sufficient to form a liquid composition having about a 15 to 35% solids content, by weight.

15. The coating or adhesive composition as defined in claim 14, said solvent being methyl ethyl ketone, toluene, or mixtures thereof.

16. The coating or adhesive composition as defined in claim 1, said cure site carboxyl groups comprising acrylic acid groups.

17. The coating or adhesive composition as defined in claim 3, said polyvinyl chloride having a molecular weight corresponding to an inherent viscosity of 1.0 to 1.40.

* * * * *